Figure 1:
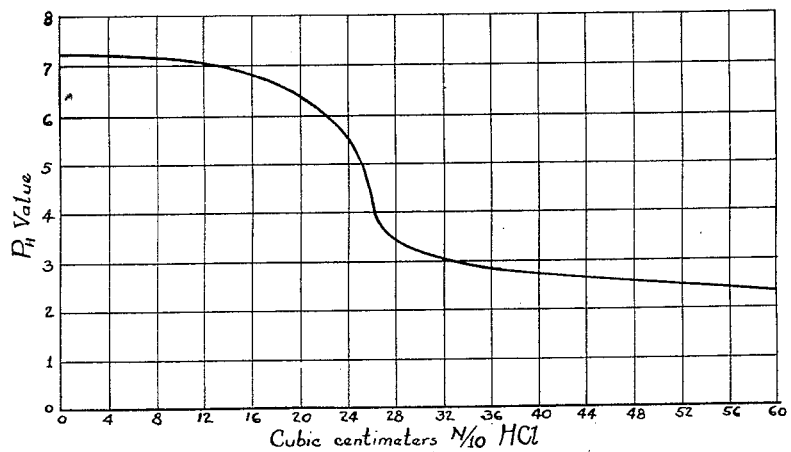

July 11, 1933.　　　J. J. GREBE ET AL　　　1,917,762

METHOD OF EXTRACTING BROMINE FROM DILUTE SALINE SOLUTIONS

Filed Aug. 4, 1930

INVENTORS
John J. Grebe, Ray H. Boundy
BY and Leonard C. Chamberlain
Thomas Griswold, Jr.
ATTORNEY Patented July 11, 1933

1,917,762

UNITED STATES PATENT OFFICE

JOHN J. GREBE, RAY H. BOUNDY, AND LEONARD C. CHAMBERLAIN, OF MIDLAND, MICHIGAN, ASSIGNORS TO THE DOW CHEMICAL COMPANY, OF MIDLAND, MICHIGAN, A CORPORATION OF MICHIGAN

METHOD OF EXTRACTING BROMINE FROM DILUTE SALINE SOLUTIONS

Application filed August 4, 1930. Serial No. 472,820.

The present invention relates to methods for the extraction of bromine from aqueous solutions containing the same in combination as bromide, and has particular regard to an improved mode of procedure adapted to recover bromine in high percentage yield from solutions possessing an extremely low content thereof, such as sea water and the like.

The known method of liberating bromine from bromide-containing solutions, such as natural brines or bitterns, consists in oxidizing such solution directly either by electrolyzing or by chemical treatment, for example, with chlorine. The liberated bromine is then removed from the solution by steaming out or by blowing out with air and the bromine vapors are either directly condensed or absorbed in a suitable absorbing medium, such as an aqueous solution of an alkali metal hydroxide or carbonate. The foregoing general procedure has been practicable when working with the usual mother liquors or strong natural brines which have hitherto served as the sources for commercial bromine production, the mother liquors and brines in question being characterized by a high content of dissolved salts, chiefly chlorides. As an example of such natural brine, that found in the Midland, Michigan district may be cited. The so called Midland brine has a content of approximately 25.5 per cent total solids consisting of the chlorides of sodium, calcium and magnesium, and a bromine content of about 0.13 per cent, i. e. 1300 parts per million. An extraction of around 97 per cent of the total bromine content thereof has been regularly attained by means of the usual commercial method, the waste effluent from the process accordingly containing about 40 parts bromine per million.

The extraction of bromine from solutions of considerably lower bromine content, such as sea water, has not been found equally feasible, however, by the simple procedure above outlined. In the case of sea water, which contains approximately 3.5 per cent total solids and 50 to 60 parts bromine per million, the total bromine content does not greatly exceed that of the effluent from present commercial processes as mentioned above, so that a high percentage extraction of bromine from sea water is not to be expected, nor is it possible of attainment by means of the aforesaid present commercial processes. Still further, the effects of greater alkalinity and greater dilution of sea water create new conditions which must be met in developing a process for extracting bromine therefrom capable of producing a commercially satisfactory yield.

We have found that certain definite acidity conditions must be established in sea water, when the same is oxidized for the liberation of bromine, in order to make possible a quantitative liberation of such bromine in the elemental state and to prevent over-oxidation thereof to form soluble oxidized compounds which would escape extraction. A further advantage of providing such degree of acidity is that it permits liberating the bromine with approximately the theoretical consumption of oxidizing agent, e. g. chlorine, instead of a more or less considerable excess thereof, as is usually employed in present commercial processes. With this and other objects in view, the invention consists in the steps hereinafter fully described and particularly pointed out in the claims, the annexed drawing and following description setting forth a detailed procedure illustrative of but a few of the ways in which the principle of the invention may be used.

In said annexed drawing:—

Figure 2:
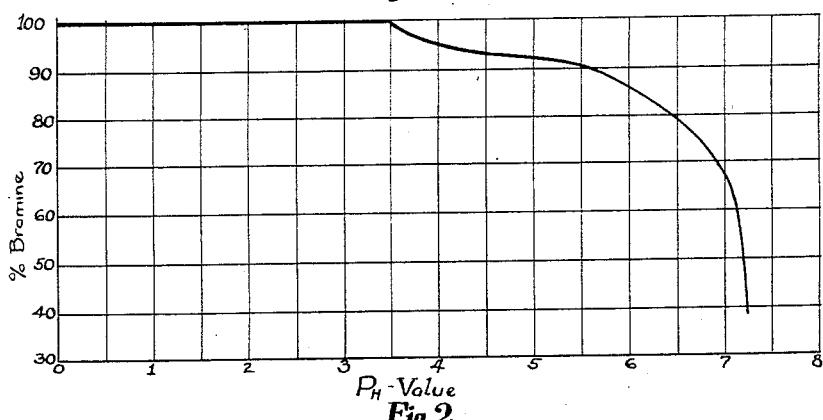
Figure 3:
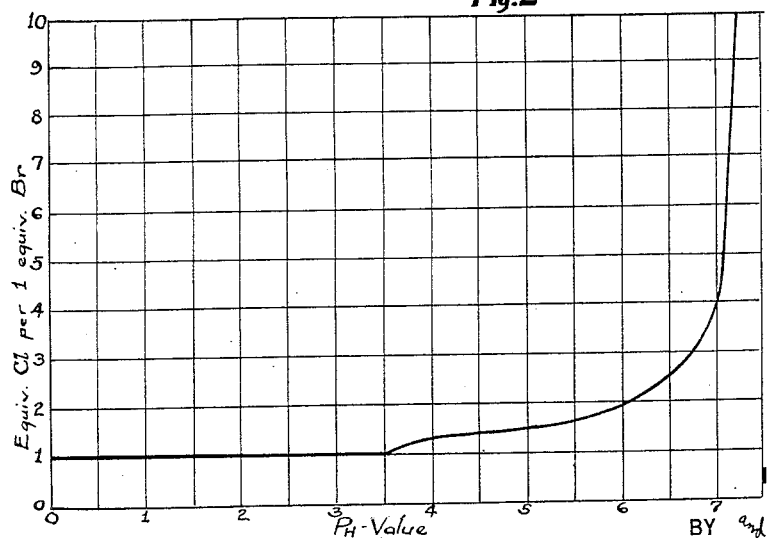

Fig. 1 is a chart showing the potentiometric titration curve of sea water with standard acid solution. Fig. 2 is a curve showing the percentage of total bromine that may be liberated from sea water by oxidizing under varying degrees of acidity of the initial solution. Fig. 3 is a curve showing the relationship between the amount of bromine liberated and the chemical equivalents of chlorine required therefor at varying degrees of acidity of the treated solution.

It is, of course, well recognized that free bromine cannot be liberated in an alkaline solution, and that the oxidation of an alkaline bromide solution results in the formation of soluble oxidized bromine compounds, such as hypobromite or bromate. Hence the natural alkalinity of sea water or similar saline solutions must first be neutralized if a quantitative liberation of bromine is to be expected. Otherwise when the solution is chlorinated such neutralization will be accomplished at the expense of free bromine production with a corresponding formation of oxidized bromine compounds from which bromine cannot be again liberated by chlorine. We have found, moreover, that even in neutral or slightly acid aqueous solutions, if sufficiently dilute, bromine may be chemically combined by hydrolysis, for instance, according to the equation;—

(1) 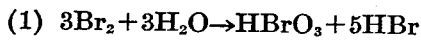  $3Br_2 + 3H_2O \rightarrow HBrO_3 + 5HBr$

Such action will continue until a sufficient concentration of acid, i. e. of $H^+$ ions, has been built up to inhibit further hydrolysis. We have found that, in the case of sea water, the acidity required to prevent hydrolysis and to enable the permanent formation of free bromine therein is expressed by a value substantially between pH=3 and pH=4. Free bromine liberated in sea water having a hydrogen ion concentration corresponding to a pH value greater than approximately pH=4 will, therefore, be continuously reabsorbed by hydrolysis until sufficient acid is formed thereby to increase the hydrogen ion concentration to a value between pH=3 and pH=4, after which further bromine liberated will remain in the elemental state and can be extracted from the solution by any of the known methods.

The presence of other ions in the solution, such as chloride ions, tends to repress the above hydrolysis of bromine, so that solutions having a higher salt content than sea water will cease to reabsorb bromine when a lower hydrogen ion concentration, i. e. a higher pH value, is established therein. In fact, a brine having a high salt content similar to that of the Midland brine hereinbefore referred to does not reabsorb bromine by hydrolysis to any appreciable extent at a degree of hydrogen ion concentration corresponding to neutrality, i. e. at pH=7, or at any lower pH value. Conversely, in solutions having a lower salt content than sea water, the hydrolysis of bromine will proceed to a somewhat higher degree of acidity before free bromine may be permanently formed therein.

It appears, therefore, that sea water must be acidified to a degree of hydrogen ion concentration between pH=3 and pH=4 before free bromine can be permanently liberated and extracted therefrom. Such acidification may be effected by addition of sufficient acid previous to the liberation of bromine to produce the required hydrogen ion concentration, or by hydrolytic reabsorption of a portion of the liberated bromine during the oxidation, or by a combination of both. Fig. 1 shows a typical potentiometric titration curve for sea water wherein the ordinates represent pH values and the abscissæ cubic centimeters of standard N/10 hydrochloric acid solution added to a 1 liter sample of the sea water. Assuming the value pH=3.5 (the mean of pH=3 and pH=4) to represent the average degree of acidity at which reabsorption of free bromine by hydrolysis ceases, 28 cubic centimeters N/10 HCl are required to acidify the raw sea water to that point. This corresponds to approximately 0.7 pound 30 per cent CHl, or 0.27 pound 96 per cent $H_2SO_4$, per ton of sea water. The quantity of acid actually required to acidify a given sample of sea water to the degree given will be subject to some variation, depending upon slight fluctuations of the composition of the sea water and to the treatment thereof previous to acidification. The curve in Fig. 1 is based upon raw sea water containing approximately the usual amount of so-called buffer substances, e. g. carbonates, etc., which upon acidification of the sea water consume acid to form weakly ionized acids without leading to a proportional increase in the hydrogen ion concentration of the acidified solution. For example, the sea water may be previously heated to decompose or precipitate some of the carbonates or other buffer substances present, after which less acid will be required to acidify the solution to the depired PH value than corresponds to that shown by the curve. In practice, however, it is generally cheaper to acidify than to heat the immense volumes of sea water that must be processed to obtain a consequential output of bromine.

If the sea water is acidified to a less degree than suffices to inhibit hydrolysis of bromine therein, and is then oxidized, as by chlorinating, more or less of the bromine formed will at first be reabsorbed according to equation (1) until the required degree of acidity is attained. One-sixth of such reabsorbed bromine will be permanently fixed as bromic acid or the equivalent so that it cannot later be liberated again directly by action of chlorine. In case the deficiency of acid is large with respect to the bromine content of the solution, repeated reabsorption and reliberation of bromine may take place as the oxidation proceeds until the required degree of acidity is built up, which would result in multiplying the above loss to the process caused by fixing of bromine in soluble over-oxidized form. Fig. 2 shows the maximum theoretical percentage of bromine recoverable from sea water of varying pH values, as calculated upon the assumption that pH=3.5 represents the average minimum acidity required for complete liberation of the bromine content thereof. The calculation is made as follows, taking, for illustration, sea water acidified to pH=5: referring to the curve of Fig. 1, it is seen that 25 cubic centimeters N/10 HCl are required per liter to acidify sea water to pH=5, i. e. 28−25=3 cubic centimeters less than enough to produce the desired acidity, i. e. pH=3.5; accordingly bromine equivalent to 3 cubic centimeters N/10 HCl per liter must be reabsorbed as per equation (1) to make up the deficiency; 1 cubic centimeter N/10 HCl per liter is equivalent to 0.008 grams Br. per liter, i. e. 8 parts Br. per million, thus 3×8=24 parts per million Br. will be reabsorbed to acidify the solution from pH=5 to pH=3.5; one-sixth of the reabsorbed bromine will be permanently fixed as bromic acid, i. e. 1/6×24 parts per million=4 parts per million; assuming 60 parts per million Br. in the original sea water, 4/60=.066, i. e. 6.6 per cent, Br. will be lost and 93.4 per cent represents the maximum recovery possible. This calculation assumes complete ionization of the acids formed by hydrolysis of bromine, since such condition will be approximately attained at the degree of dilution existing in the solution. Naturally, if ionization should not be complete, a correspondingly larger proportion of the total bromine would be hydrolyzed to furnish the required concentration of $H^+$ ions. Similar calculations based upon the curve of Fig. 1 may be made to determine other points on the curve of Fig. 2. Referring to the latter figure, it is seen that the curve slopes gradually from pH=3.5 to about pH=5 and then breaks rapidly at higher pH values, until at pH=7.2, i. e. the value for the original sea water, the maximum theoretical recovery of bromine therefrom by direct oxidation without acidification is only 39 per cent.

It is obvious, furthermore, that of the bromine reabsorbed by hydrolysis in insufficiently acidified seat water, 5/6 thereof must be reliberated by action of chlorine in order to be in condition for extraction, consequently in such case more than one chemical equivalent of chlorine will be required to liberate the bromine actually extracted. The curve in Fig. 3 shows the equivalents of chlorine consumed for each equivalent of bromine liberated when starting with sea water of varying pH values. As much as 10 equivalents of chlorine per mole of bromine liberated would be required of raw sea water of pH=7.2 were chlorinated directly, whereas if such seat water were first acidified to approximately pH=3.5 only one equivalent of chlorine would be consumed for each equivalent of bromine liberated.

Acidification in excess of the amount required to establish a hydrogen ion concentration between pH=3 and pH=4 will not alter the result obtained, insofar as the extraction of bromine is concerned. However, there is no advantage in so doing, and the extra cost of the acid used adds to the cost of the product. In view of the enormous volumes of sea water which must be processed for even a moderate output of bromine, it is essential in commercial operations to avoid using any material excess of acid beyond that required to establish the desired pH value in the acidified sea water. On the other hand, a slight deficiency of acid will not greatly lower the yield of bromine, although with solutions having a degree of acidity less than that expressed as pH=6, the loss increases rapidly. In general, therefore, acidification to a pH value between 3 and 6 may be considered satisfactory for a commercial process of extracting bromine from sea water. For a solution of different composition from sea water, the optimum acidity will depend primarily upon the concentration of ions therein, but the principle herein explained will hold good and the appropriate acidity range for such solution may be determined readily by experiment.

In a complete process for extracting bromine from sea water and solutions of similar composition, the latter is first acidified with a strong acid, e. g. hydrochloric acid or sulphuric acid, to a pH value of 6 or less, preferably between pH=3 and pH=4. To treat large volumes of sea water with the very small proportional amounts of acid required, the latter may be conveniently metered into a pipe through which the sea water is pumped to a storage tank or to a chlorinating apparatus, suitable means being installed for measuring hydrogen ion concentration in the acidified solution. The acidified sea water is then chlorinated, which may be conveniently carried out in a packed tower or column in which the sea water flows in distributed over the body of packing and is contacted with chlorine introduced at some point near the lower end of such tower. The chlorine is preferably to be added in amount not greatly exceeding the theoretical equivalent of the bromine to be liberated. An excess thereof does not interfere with the liberation of bromine, but must be separated from the latter in subsequent steps of the process. The control of chlorine addition may be effected by adding a pre-determined amount thereof, based upon the known analysis of the sea water, or other methods of measurement may be employed, as, for instance, the method based upon the potential of free bromine in the solution which may be determined as described in our co-pending application Serial No. 472,027, filed July 31, 1930.

The chlorinated solution, in which the bromine has been liberated, is then treated to separate bromine as vapor therefrom, for instance, by blowing out with a blast or current of air in the manner old in the art, as described, for instance, in U. S. Patent 714,160 to Herbert H. Dow. The blowing-out operation may be conducted in one or more packed towers in which the bromine solution resulting from the chlorination is contacted with a voluminous current of air. By suitably proportioning the volume of air and the height of the tower to the cross section thereof and the volume of bromine solution to be handled, the free bromine may be substantially completely blown out with air. The bromine-laden air may then be passed through one or more scrubber towers wherein such air is contacted with an aqueous solution of an alkali to absorb the bromine therefrom, also in the known manner. Other methods of vaporizing bromine and separating the same from the solution may be employed, however, such as by steaming out or by vacuum vaporization in which the bromine vapor along with some water vapor may be removed by subjecting the bromine solution to a vacuum at normal or moderately elevated temperatures. The resulting mixture of bromine and water vapor may then be condensed, or absorbed in a suitable absorbent medium, such as active charcoal, an organic solvent or an aqueous alkali solution.

The novelty of our invention lies, at least in part, in the discovery of the conditions required for quantitatively liberating bromine from sea water and like dilute solutions of low bromine content and preventing recombination thereof by hydrolysis or otherwise to form soluble oxidized compounds not capable of being vaporized therefrom in any of the various ways mentioned, and in the provision of a process utilizing our discovery whereby bromine may be recovered from sea water in high yield and at low cost comparable with that when much more concentrated bromide-containing solutions are employed as the source of bromine. No preliminary concentration of the sea water, as by solar-evaporation, is required, and no application of heat for carrying out any of the process steps, thus making the process independent of geographical location and climate. By establishing the requisite condition of acidity in the sea water and then oxidizing the acidified solution, the liberation of bromine therefrom may be made substantially quantitative and no more than the theoretical equivalent of oxidizing agent is required therefor. While oxidation by direct addition of chlorine to the acidified solution is the preferred procedure, other methods of oxidation may be employed within the scope of the invention, such as by electrolyzing or by treating with other chemical oxidizing agents either to produce chlorine in situ first, or to oxidize the bromide directly to free bromine without the intermediate formation of chlorine.

This application is a continuation in part of the prior application of John J. Grebe and Ray H. Boundy Serial No. 446,678, filed April 23, 1930.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. The process of exacting bromine from sea water and the like which comprises acidifying the same to produce therein a hydrogen ion concentration substantially between the limits expressed as pH=3 and pH=6, oxidizing to liberate bromine in the elemental state, vaporizing such bromine and absorbing the vapors in an absorbent medium therefor.

2. The process of extracting bromine from sea water and the like which comprises acidifying the same to produce therein a hydrogen ion concentration substantially between the limits expressed as pH=3 and pH=6, chlorinating to liberate bromine in the elemental state, vaporizing the bromine and absorbing the vapors in an absorbent medium therefor.

3. The process of extracting bromine from sea water and the like which comprises acidifying the same to produce therein a hydrogen ion concentration substantially between the limits expressed as pH=3 and pH=4, chlorinating to liberate bromine in the elemental state, separating such bromine from the solution by blowing out with a current of air and recovering the bromine from the air current.

4. The process of extracting bromine from sea water and the like which comprises acidifying the same to produce therein a hydrogen ion concentration corresponding to a value substantially between pH=3 and pH=4, chlorinating to liberate bromine in the elemental state, separating such bromine by blowing out with a current of air and passing the bromine-laden air in contact with an absorbent medium for the bromine.

5. The process of extracting bromine from sea water and the like which comprises acidifying the same to produce therein a hydrogen ion concentration corresponding to a value substantially between pH=3 and pH=4, chlorinating to liberate bromine in the elemental state, separating such bromine by blowing out with a current of air and scrubbing the bromine-laden air with an equeous alkaline solution.

6. The process of extracting bromine from sea water and the like which comprises acidifying the same to produce therein a hydrogen ion concentration substantially between the limits expressed as pH=3 and pH=4, oxidizing to liberate bromine in the elemental state, vaporizing such bromine and recovering the vapors thereof.

Signed by us this 30th day of July, 1930.

JOHN J. GREBE.
RAY H. BOUNDY.
LEONARD C. CHAMBERLAIN.